Figure 1:
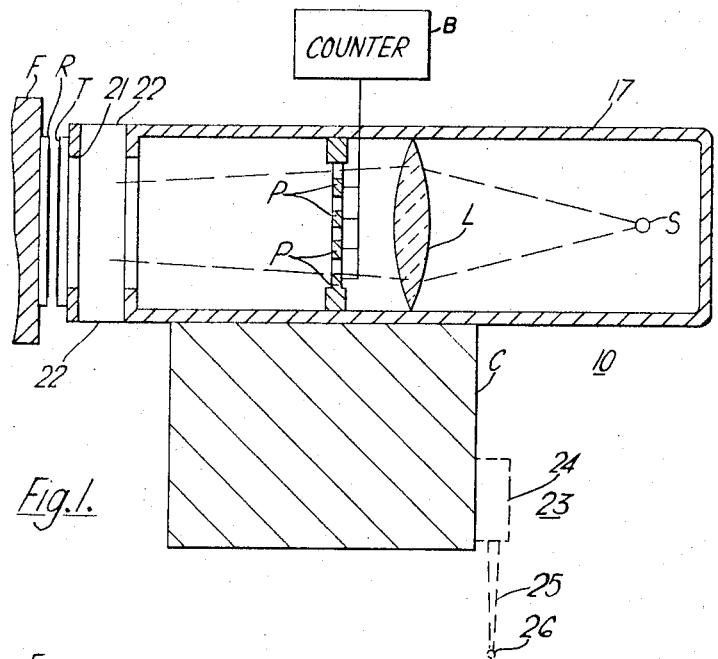

Feb. 28, 1967   A. G. KERR   3,305,931
MEASURING APPARATUS

Filed May 7, 1965   2 Sheets-Sheet 1

Inventor
A. G. KERR
By
Cameron, Kerkam & Sutton
Attorneys

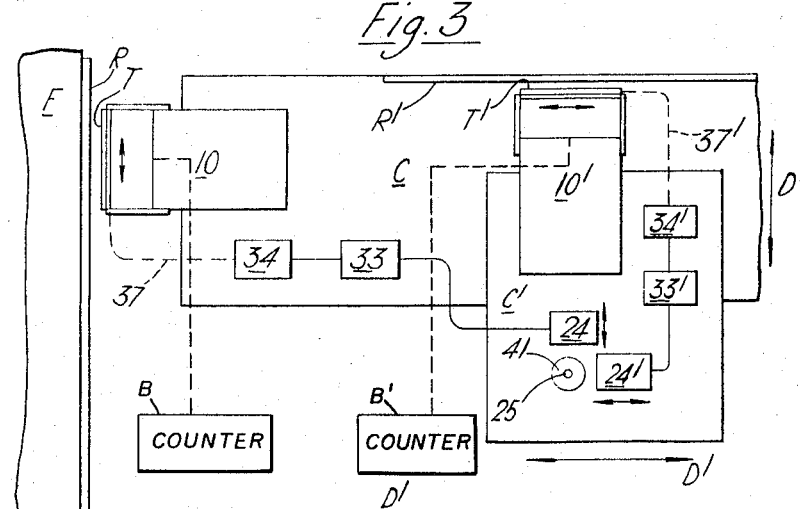

United States Patent Office 3,305,931
Patented Feb. 28, 1967

3,305,931
MEASURING APPARATUS
Andrew Guy Kerr, Edinburgh, Scotland, assignor to Ferranti, Limited, Hollinwood, Lancashire, England, a company of Great Britain and Northern Ireland
Filed May 7, 1965, Ser. No. 453,935
Claims priority, application Great Britain, May 8, 1964, 19,189/64
9 Claims. (Cl. 33—172)

This invention relates to measuring apparatus of the type, hereinafter referred to as the type stated, in which for measuring dimensions in at least one given direction (such as the X or the Y direction of a coordinate system), the position of a movable probe with respect to a reference structure is determined from the response of two or more photoelectric transducers to the movement of a pattern set up by two closely-parallel optical gratings one of which is fixed to the reference structure to extend in the given direction and the other of which is an index grating movable along the fixed grating by a carriage which also supports the probe.

Using such apparatus, a dimension of a workpiece or other object may be measured by bringing the probe tip successively into engagement with the two workpiece surfaces concerned and deriving the measurement in known manner from the responses of the transducers.

With such an arrangement a difficulty may be experienced in bringing the probe tip into engagement with a workpiece surface. If the carriage continues to be moved inadvertently after the probe has engaged the surface, the probe may be undesirably stressed or may even be strained appreciably. On the other hand the attempt to avoid thus stressing the probe may cause the carriage to be moved insufficiently, with the result that the probe tip does not quite touch the workpiece surface. In either case an appreciable error may be introduced into the measurement. An object of the invention is accordingly to provide measuring apparatus of the type stated in which this difficulty is to some extent overcome.

In accordance with the present invention, in measuring apparatus of the type stated the probe is so supported by the carriage as to allow the probe tip to have a restricted range of resiliently-resisted movement in the given direction with respect to the carriage from a normal position of the tip, and a connection is provided between the probe and the index grating such that movement of the probe tip within that range from the normal position results in a compensatory movement of the same extent and sense of the index grating with respect to the carriage, thereby preventing the apparatus from responding to those movements of the carriage which result in said restricted movements of the probe tip.

By "probe tip" is meant that part of the probe which engages the workpiece or other object that is being measured.

Figure 2:
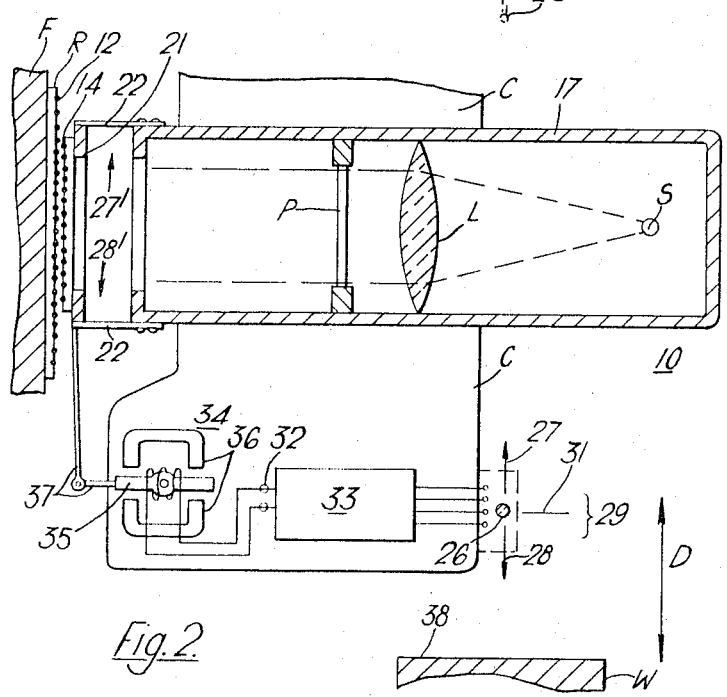

In the accompanying drawings,

FIGURES 1 and 2 show respectively in part sectional elevation and plan, measuring apparatus in accordance with one embodiment of the invention, FIGURE 3 shows in plan the embodiment of FIGURES 1 and 2 modified for making measurements in two directions, FIGURES 4 and 5 show in plan and sectional elevation a detail of the embodiment of FIGURE 3, FIGURE 6 shows an alternate embodiment wherein the connection between the probe and the index grating is in the form of a servo combination, and FIGURE 7 shows another alternative wherein the index grating is effected by the agency of piezo-electric bender crystals.

In carrying out the invention according to one form by way of example, apparatus for measuring dimensions in a given direction includes an optical unit 10, see FIGS. 1 and 2, secured to a carriage C and arranged to move relative to a fixed reference structure or frame F in the given direction; this direction, which is normal to the plane of the paper in FIG. 1 and parallel to it in FIG. 2, where it is defined by the arrows D, will for convenience be assumed to be horizontal.

Secured to the frame F is a horizontal length of reflection grating R extending in direction D and ruled regularly with straight vertical lines 12 coplanar with one another. Closely parallel to this grating is a short length of transmission grating T (the index grating referred to above) ruled regularly with straight coplanar parallel lines 14 of pitch identical with that of lines 12. Lines 14 are slightly skew with respect to lines 12 so that the two gratings when irradiated set up a cyclic pattern of alternate opacities and transparencies which extends vertically and moves in that direction when grating T moves horizontally.

Grating T forms part of the optical unit 10. This unit includes a light-tight casing 17 enclosing a source S of illumination. The light from this source is projected by a lens L through grating T to grating R and is reflected back by grating R through grating T to a vertical array of four photocells P within the casing. The cells are spaced apart to allow the light rays from source S to pass between them on their way to the gratings. The cells respond to the vertical movements of the pattern, as illuminated by source S; their outputs are applied to display means in the form of a bidirectional counter B arranged to count the pattern cycles, adding or subtracting in dependence on the direction of pattern movement, and display as a count the measurement of the carriage movement.

In the present embodiment, grating T is secured to the casing 17. In the present invention, this grating is mounted in a frame 21 which is carried resiliently from casing 17 by two flat springs 22; these are normal to the plane of the grating lines and allow a limited horizontal movement of the grating relative to the casing whilst remaining parallel to grating R.

Secured to the carriage C is a comparator gauge 23. Briefly, this consists of a pickoff 24 (FIG. 1) from which extends downwards a rigid vertical probe 25 having at one end a tip 26 for engagement with the workpiece to be measured. The probe is mounted by its other end at the pickoff so as to permit a movement of the tip in one or other of opposite senses (directions) 27 or 28, see FIG. 2, over a restricted range 29, shown greatly exaggerated for clarity, from a normal central position 31 of the tip. Such movement is resiliently resisted by a spring or torsion rod which forms part of the pick-off and biases the tip towards the normal position. The pickoff is arranged to supply at terminals 32, by way of a phase-sensitive bridge circuit 33, a direct-current signal dependent in value and polarity on the extent and direction of the movement of the probe tip within the restricted range. This D.C. signal from terminals 32 is applied to an electromechanical actuator 34, shown as a wound rotor 35 arranged to be energised by this D.C. signal and co-operating with a permanent-magnet stator 36. Rotor 35 is coupled by a mechanical connection in the form of links 37 to the frame 21 which carries grating T. The arrangement is such that the D.C. signal resulting from a movement of the probe tip in one of the senses 27 or 28 relative to the carriage from the normal position displaces rotor 35 in the sense to displace the index grating T relative to the carriage in the same sense $27^1$ or $28^1$, as the case may be, and to the same extent as the movement of the probe tip with respect to the carriage.

In operation, so long as the probe is in its normal position 31, grating T is in effect fixed with respect to the casing 17 and follows exactly the movement of it and the carriage. Suppose now it is desired to measure a dimension of a workpiece W by steps which begin with bringing the tip 26 of the probe into engagement with a surface 38 of the workpiece.

To effect this engagement, carriage C is moved towards surface 38. During this movement the probe is maintained in its normal position 31 by the spring bias, with the result that grating T is effectively fixed to unit 10. Grating T accordingly participates in the carriage movement, the pattern moves in correspondence, and the counter responds to the pattern movement.

If the carriage is halted with tip 26 just touching surface 38, the counter reading has the required initial value appropriate to the distance of surface 38 from some datum position.

Suppose on the other hand that the carriage has overshot this required position—in other words, its movement has been continued towards surface 38 to a small extent after the probe tip has engaged it. In prior arrangements employing a purely mechanical probe secured rigidly to the carriage, the result of this excess movement would be to bend and therefore strain the probe, perhaps injuriously. A further undesirable effect of this excess movement would be to carry grating T beyond the position at which the counter had the correct initial reading, thereby starting the measurement with an incorrect reading. With the arrangement in accordance with the invention, however, the excess movement deflects the probe in the sense 27. As the movement is resiliently resisted by the bias spring, this deflection, if within the range 29, does not injure the probe. Moreover, the probe tip deflection, converted into a D.C. signal at terminals 32, operates by way of actuator 34 to cause a compensatory movement of grating T to the same extent and in the same sense $27^1$ with respect to the carriage, with the result that during the excess movement of the carriage towards the workpiece grating T remains fixed with respect to grating R and the counter reading remains unaffected at the correct initial value arrived at when the probe tip touched surface 38 before the excess movement began.

In general, therefore, the apparatus does not respond to such movements of the carriage as result in movements of the probe tip within the restricted range.

The actual stress on the probe is limited to the restoration value of the small centralising force set up by the biasing spring.

The probe must be rigid enough not to bend during movements of the tip over the range 29, otherwise such movements would in part be taken up by the flexing of the probe and so would not produce adequate compensatory movements of the index grating.

It will be appreciated that as long as the carriage overshoot is kept within the limit set by the restricted range 29 of probe tip movement, the measuring apparatus in accordance with the invention, in addition to the advantage of safeguarding the probe from injury, has the further advantage of not requiring a highly accurate positioning of the carriage in order to obtain accurate results.

Among the various alternatives within the scope of the invention, the connection between the probe and the index grating may take the form of a servo combination of a synchro control transmitter ST actuated by the probe and a corresponding synchro receiver SR to adjust the grating as illustrated in FIG. 6.

In another alternative, the movement of the index grating is effected by the agency of piezo-electric bender crystals BC to which the voltage from terminals 32 is applied, thereby obviating the need for an actuator, such as actuator 34, of an electromechanical kind such an arrangement is illustrated in FIG. 7.

The embodiment first described may be modified for making measurements in two directions at right angles to one another, such as the X and Y directions of a coordinate system. A convenient arrangement is shown in FIG. 3, in which the components which have already been described are given their previous references, and corresponding additional components have the appropriate references primed.

In this arrangement the probe 25 is not supported by carriage C direct but by way of a second carriage $C^1$ arranged to move relative to carriage C in a second direction $D^1$ normal to the given direction D so as to allow the measurement of dimensions in both those directions. The movement of carriage $C^1$ relative to carriage C is measured by a second length of reflection grating $R^1$ similar to grating R but fixed to carriage C to co-operate with a second index grating $T^1$ similar to grating T but carried by a second optical unit $10^1$ fixed to carriage $C^1$ and similar to unit 10.

From carriage $C^1$ the probe is supported by a mount which allows resiliently-resisted movements in the two directions D and $D^1$. A suitable form of mount is described below with reference to FIGS. 4 and 5.

The movement of the probe tip in the direction D over the restricted range 29 (FIG. 2) is sensed by a pickoff 24 the output from which is applied by way of a circuit 33 and an actuator 34 to control the position of index grating T with respect to carriage C to compensate for probe deflections in direction D as before.

Similarly the movement of the probe in direction $D^1$ is applied by way of corresponding stages $24^1$, $33^1$, and $34^1$, to control the position of index grating $T^1$ with respect to carriage $C^1$ to compensate for probe deflections in direction $D^1$. Display means such as, for example, counters B and $B^1$ are connected to the optical units 10 and $10^1$, respectively, for deriving from their responses the required measurements.

In normal use, of course, a deflection of the probe tip will be in a direction compounded of each direction D and $D^1$, and each pickoff and its associated equipment will respond only to the extent of the component of the displacement resolved in the direction with which that pickoff is concerned.

A convenient arrangement for the two-dimensional probe mount and pickoffs is shown in plan and sectional elevation in FIGS. 4 and 5. It is again assumed for ease of reference that the probe is vertical when undeflected. The rigid probe 25 is carried at the centre of a resilient diaphragm 41 (see FIG. 5) which covers an aperture 42 in carriage $C^1$. The diaphragm, acting as the spring bias for both directions, normally holds the probe truly vertical and resiliently resists any tendency of the probe to be deflected as the result of an overshoot of either or both carriages after the probe tip 26 has engaged a workpiece.

A rigid upwards extension of the probe carries the moving element or armature 43 of a bidirectional linear pickoff 44 of the inductive kind. This armature is in the form of a crosspiece of four equal arms of magnetic material each of which co-operates with one of the wound poles of a four-pole stator 45 (see also FIG. 4). Windings 46 of one pair of opposite stator poles, aligned in direction D, are connected as two of the arms of an inductance bridge 47 the other two arms of which are formed by the centre-tapped secondary winding 48 of a transformer 51 energised by an alternating source applied to the primary winding 52. The output from the bridge is derived from the common point of windings 46 and the centre tap of winding 48; accordingly these two points are connected to the input of actuator 34.

Similar arrangements are made to respond to movements of the probe tip in direction $D^1$, the components being indicated by the corresponding references primed.

With the probe tip in its normal position, with the probe axis at the centre of the stator ring, both bridges 47 and 47¹ are balanced and the actuators 34 and 34¹ remain unoperated.

Any movement of the probe tip which has a component in the direction D unbalances bridge 47 and causes actuator 34 to be energized in the sense required to move grating T in the compensatory direction. Movements of the probe in direction $D^1$ are compensated in a similar manner.

The combination of probe and pickoff just described, with its direct connection between probe and armature, in particular with the armature carried solely by the probe, has the advantage of obviating the frictional losses associated with arrangements in which the armature is mounted independently of the probe and linked to it in some way mechanically.

Instead of being carried by a diaphragm, the probe may be on a ball-and-socket type of support, with the necessary spring bias applied separately.

What I claim is:

1. Measuring apparatus to respond to the movement of a probe in a given direction with respect to a reference structure including a reference optical grating secured and fixed to said structure and extending in said direction, a carriage movable in said direction with respect to said structure and said reference optical grating, a resiliently mounted probe supported by the carriage, said probe having a tip movable within a restricted range of resiliently-resisted movement in said direction with respect to the carriage from a normal position of the tip, an index optical grating supported by the carriage, the gratings being ruled and combined to set up an optical pattern movable with respect to the carriage as the carriage moves with respect to the structure, photoelectric transducers for responding to such movement of the pattern, display means connected to the transducers for deriving from their responses the required measurement, and connection means between the probe and the index grating to compensate for movement of the probe tip in said restricted range from the normal position by a fully compensatory movement of the same extent and sense of the index grating with respect to the carriage, preventing the display means from responding to those movements of the carriage which result in said restricted movements of the probe tip.

2. Apparatus as claimed in claim 1 wherein said connection means includes pickoff means for converting a mechanical movement into an electrical signal, the probe being coupled to the pickoff means, an actuator for converting an electrical signal into a mechanical movement, an electrical connection from the pickoff means to the actuator, and a mechanical connection from the actuator to the index grating, whereby the response of the pickoff means to said restricted movements of the probe tip is converted into said compensatory movement of the index grating.

3. Apparatus as claimed in claim 2 wherein the actuator is of an electromechanical kind.

4. Apparatus as claimed in claim 2 wherein the actuator takes the form of a piezoelectric bender crystal.

5. Apparatus as claimed in claim 1 wherein said connection means is in servo form and includes a synchro control transmitter arranged to be actuated by the probe and a corresponding receiver arranged to convert the signal from the transmitter into said compensatory movement of the index grating.

6. Apparatus as claimed in claim 1 combined with means for measuring dimensions in a direction normal to said given direction, the probe being common to both.

7. Measuring apparatus to respond to the movement of a probe in each of first and second directions with respect to a reference structure including a first reference optical grating secured to said structure and extending in the first direction, a first carriage movable in the first direction with respect to the structure, a second reference optical grating secured to the first carriage and extending in the second direction, a second carriage movable along the first carriage in the second direction, a resiliently mounted probe supported by said second carriage, said probe having a tip movable within a restricted range of resiliently-resisted movement in each of said directions with respect to the second carriage from a normal position of the tip, first and second index optical gratings secured to the carriages to co-operate with the first and second reference gratings, respectively, so as to set up first and second optical patterns, the first pattern being movable with respect to the first carriage as the first carriage moves with respect to the reference structure, and the second pattern being movable with respect to said second carriage as the second carriage moves with respect to the first carriage as the case may be, photoelectric transducers for responding to such movements of the patterns, display means connected to the transducers for deriving from their responses the required measurements in said directions, and connection means between the probe and the index gratings to compensate for movement of the probe tip within each of said restricted ranges from the normal posiiton by a compensatory movement of the same extent and sense of the first or second index grating, as the case may, with respect to the carriage which supports it, thereby preventing the display means from responding to those movements of the carriages which result in said restricted movements of the probe tip.

8. Apparatus as claimed in claim 7 wherein the probe is supported from the second carriage by a resilient diaphragm.

9. Apparatus as claimed in claim 8 wherein said connection means includes a bidirectional pickoff common to both index gratings and having a stator and an armature, the armature being secured to the probe so as to move with respect to the stator in response to said restricted movements of the probe tip.

References Cited by the Examiner

FOREIGN PATENTS 552,287   3/1943   Great Britain.

LEONARD FORMAN, *Primary Examiner.*

J. M. FREED, *Assistant Examiner.*